US012741563B2

(12) United States Patent
Audhav et al.

(10) Patent No.: US 12,741,563 B2
(45) Date of Patent: Sep. 22, 2026

(54) COMPUTER IMPLEMENTED METHOD FOR CONTROLLING ENERGY OR POWER UTILIZATION OF A BATTERY PACK

(71) Applicant: VOLVO TRUCK CORPORATION, Gothenburg (SE)

(72) Inventors: Tove Audhav, Landvetter (SE); Arne Andersson, Mölnlycke (SE); Fredrik Blomgren, Hisings Kärra (SE); Staffan Luong, Borås (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 388 days.

(21) Appl. No.: 18/334,756

(22) Filed: Jun. 14, 2023

(65) Prior Publication Data

US 2023/0406151 A1 Dec. 21, 2023

(30) Foreign Application Priority Data

Jun. 17, 2022 (EP) .................................... 22179527

(51) Int. Cl.
*B60L 58/13* (2019.01)
*B60L 58/16* (2019.01)
*B60W 10/26* (2006.01)

(52) U.S. Cl.
CPC ............... *B60L 58/13* (2019.02); *B60L 58/16* (2019.02); *B60W 10/26* (2013.01); *B60W 2510/244* (2013.01)

(58) Field of Classification Search
CPC ......... B60L 58/13; B60L 58/16; B60W 10/26; B60W 2510/244
See application file for complete search history.

(56) References Cited

U.S. PATENT DOCUMENTS

2013/0134784 A1* 5/2013 Dung .................... G06N 20/00 307/43
2015/0105948 A1 4/2015 Chang et al.
(Continued)

FOREIGN PATENT DOCUMENTS

| | | | |
|---|---|---|---|
| DE | 102018112264 | A1 | 11/2018 |
| EP | 3831646 | A2 | 6/2021 |
| SE | 1951233 | A1 | 9/2020 |

OTHER PUBLICATIONS

Extended European Search Report in corresponding European Application No. 22179527.1 dated Dec. 16, 2022 (18 pages).

*Primary Examiner* — Andrea C Leggett
(74) *Attorney, Agent, or Firm* — Jeffri A. Kaminski; Venable LLP

(57) ABSTRACT

A computer implemented method for controlling energy or power utilization of a battery pack in a rechargeable energy storage system is described. The battery pack is configured to be operated within an operating window defined by its state-of-charge, SOC, according to normal predetermined SOC limits, and extended predetermined SOC limits. The method includes determining a battery pack condition level; comparing the battery pack condition level with a first threshold; providing predicted energy or power utilization of the battery pack; comparing the predicted energy or power utilization with a second threshold. In response of determining that the predicted energy or power utilization is above the second threshold, and that the battery pack condition level is below the first threshold, operating the battery pack within the operating window defined by the extended predetermined SOC limits.

14 Claims, 4 Drawing Sheets

(56) References Cited

U.S. PATENT DOCUMENTS

| | | | | |
|---|---|---|---|---|
| 2017/0299660 | A1 | 10/2017 | Saint-Marcoux et al. | |
| 2020/0406782 | A1 | 12/2020 | Brunet et al. | |
| 2022/0032814 | A1 * | 2/2022 | Lee | B60L 58/21 |
| 2023/0118313 | A1 * | 4/2023 | Asai | H01M 10/425 702/63 |

* cited by examiner

COMPUTER IMPLEMENTED METHOD FOR CONTROLLING ENERGY OR POWER UTILIZATION OF A BATTERY PACK

TECHNICAL FIELD

The present invention relates to a computer implemented method for controlling energy or power utilization of a battery pack in a rechargeable energy storage system, RESS, of a vehicle. The invention furthermore relates to an electric vehicle, a computer program and a computer readable medium.

The invention may be applied in any powertrain that comprises an electric machine powered by a battery pack. In particular, the invention can be applied in electrically operated heavy-duty vehicles, such as trucks, buses and construction equipment. Although the invention will be described with respect to a fully electrified heavy-duty truck, the invention is not restricted to this particular vehicle, but may also be used in other vehicles such as passenger cars. It is applicable in fully electrically operated vehicles as well as in hybrid vehicles, comprising also a combustion engine or a fuel cell.

BACKGROUND

A vehicle typically comprises an engine for propelling the vehicle. The engine may be powered by various means, such as e.g. by liquid or gaseous fuel in an internal combustion engine, or by electric power in an electric machine. Moreover, hybrid solutions exist in which the vehicle is propelled both by an internal combustion engine and an electric machine. In either way, energy storage devices are used to store the energy needed in order to operate the engine for propelling the vehicle. For an electric machine, the energy storage devices may be battery packs or supercapacitors, comprised in an energy storage system, ESS. Both fully electrically operated vehicles and hybrid vehicles may be referred to as electric vehicles.

In an electric vehicle, the electric machine is part of a powertrain which transform energy from the energy storage system to the propelling means, typically the wheels of the vehicle. For this purpose, the powertrain further comprises transmission and drive shafts. In order to control the operation of the engine, and any related actions such as e.g. power or energy to be drawn from the ESS, the vehicle comprises a controlling apparatus. For example, in a vehicle comprising an electric machine, the controlling apparatus is configured to control an electric machine driver which is configured to control the operation of the electric machine.

For ESS comprising a battery pack, the battery pack is normally restricted to be operated within a certain operating window of the state-of-charge, SOC. Thus, all available energy of the battery pack is not made available for usage. However, under certain circumstances, it would be desired to utilize more power or energy of the battery pack than what is allowed according to the restricted operating window. Thus, there is a need in the industry for an improved control of the powertrain, in particular for controlling energy or power utilization of the battery pack.

SUMMARY

It is an object of the present invention to at least to some extent alleviate the shortcomings discussed above.

According to at least a first aspect of the present invention, a computer implemented method for controlling energy or power utilization of a battery pack in a rechargeable energy storage system, RESS, of a vehicle, the battery pack being configured to be operated within an operating window defined by its state-of-charge, SOC according to normal predetermined SOC limits, and extended predetermined SOC limits in which at least one of the upper limit and lower limit exceeds the corresponding limit of the normal predetermined SOC limits, is provided. The method comprises:

- determining a battery pack condition level,
- comparing the battery pack condition level with a first threshold value,
- providing predicted energy or power utilization of the battery pack,
- comparing the predicted energy or power utilization with a second threshold value,
- in response of determining that the predicted energy or power utilization is below the second threshold value, operating the battery pack within the operating window defined by the normal predetermined SOC limits, and in response of determining that the predicted energy or power utilization is above the second threshold value, and that the battery pack condition level is below the first threshold value, operating the battery pack within the operating window defined by the extended predetermined SOC limits.

Hereby, the extended predetermined SOC limits can be utilized in an advantageous manner. That is, as the battery pack condition level is used as input together with the predicted energy or power utilization in determining whether or not the battery pack is to be operated by the extended predetermined SOC limits, a well-balanced utilization of the battery pack considering health status (corresponding to the battery pack condition level e.g. as a function of battery pack aging) and battery pack utilization (e.g. corresponding to the battery pack capacity) is achieved. Typically, operating the battery pack within the operating window defined by the extended predetermined SOC limits implies an increase in the battery pack condition level (e.g. increased aging and decreased battery pack health status) as compared to operating the battery pack within the operating window defined by the normal predetermined SOC limits. That is, a high battery pack condition level is associated with a low battery pack health status (worse condition) and a low battery pack condition level is associated with a high battery pack health status (better condition). Furthermore, operating the battery pack within the operating window defined by the extended predetermined SOC limits implies an increased battery pack utilization (e.g. increased battery pack capacity) as compared to operating the battery pack within the operating window defined by the normal predetermined SOC limits. Therefore, operating the battery pack within the operating window defined by the extended predetermined SOC limits in response of determining that the predicted energy or power utilization is above the second threshold value, and that the battery pack condition level is below the first threshold value, ensures that the increased battery pack utilization owing to the operation of the battery pack within the operating window defined by the extended predetermined SOC limits is only allowed in case the battery pack health status is high enough, i.e. that the battery pack condition level is below the first threshold value.

According to at least one example embodiment, the battery pack condition level is defined at least by the total amount of times, or total operational time, in which the battery pack has been operated by the extended predetermined SOC limits as compared to the normal predetermined SOC limits.

Hereby, the battery pack condition level may be directly correlated to the normal and extend predetermined SOC limits, and corresponding historical operations thereof. For example, the battery pack condition level may be defined by the ratio of the total amount of times, or total operational time, in which the battery pack has been operated by the extend predetermined SOC limits and the total amount of times, or total operational time, in which the battery pack has been operated by the normal predetermined SOC limits. Thus, the first threshold value may correspond to such ratio, and e.g. be set to a value of between 0.02 and 0.05. The battery condition level may furthermore be defined by throughput and/or temperature history of the battery pack.

According to at least one example embodiment, the battery pack condition level is defined at least by the estimated total amount of times, or total operational time, in which the battery pack is predicted to be operated by the extended predetermined SOC limits as compared to the normal predetermined SOC limits during the predicted energy or power utilization of the battery pack.

Hereby, the battery pack condition level may be correlated to the predicted energy or power utilization. For example, the corresponding predicted energy or power utilization of the battery pack may be determined in response to given preview information of the vehicle operation, i.e. predicted vehicle operation. Thus, the estimated, or preferred, total amount of times, or total operational time, in which the battery pack is predicted to be operated by the extended predetermined SOC limits as compared to the normal predetermined SOC limits during such predicted energy or power utilization of the battery pack may be used to define the battery pack condition level. The battery pack condition level may be defined by the ratio of the total amount of times, or total operational time, in which the battery pack is predicted to be operated by the extended predetermined SOC limits and the total amount of times, or total operational time, in which the battery pack is predicted to be operated by the normal predetermined SOC limits. Thus, for a specific predicted vehicle operation, e.g. travelling along a specific route, it may be determined that the estimated (or preferred) total amount of times, or total operational time in which the battery pack is predicted to be operated by the extended predetermined SOC limits exceeds that of which is allowed according to the first threshold value. Such prediction may e.g. be based solely on the desire to operate the battery pack by the extended predetermined SOC limits in response to the predicted energy or power utilization (i.e. corresponding to that the predicted energy or power utilization is above the second threshold value). Thus, for such specific route, operation of the battery pack by the extended predetermined SOC limits may be prohibited, as it will reduce the battery pack health status too much.

According to at least one example embodiment, operation of the battery pack by the extended predetermined SOC limits is allowed until the first threshold value of the battery pack condition level is reached, whereafter operation of the battery pack by the extended predetermined SOC limits is prohibited. As a further alternative, at least one of the first and second threshold values may be set stricter, e.g. the first threshold value may be decreased, and/or the second threshold value may be increased. For example, by increasing the second threshold value, a lower value of the total amount of times, or total operational time in which the battery pack is predicted to be operated by the extended predetermined SOC limits is achieved. Hereby, the second threshold value may be adapted to reduce the total amount of times, or total operational time in which the battery pack is operated within the operating window defined by the extended predetermined SOC limits.

According to at least one example embodiment, the battery pack condition level is defined at least by the total amount of times, or total operational time, in which the battery pack has been operated by the extended predetermined SOC limits as compared to the normal predetermined SOC limits, and at least by the estimated total amount of times, or total operational time, in which the battery pack is predicted to be operated by the extended predetermined SOC limits as compared to the normal predetermined SOC limits during the predicted energy or power utilization of the battery pack.

Hereby, the battery pack condition level may be defined at least partly by the historical operation of the battery pack, and at least partly by the predicted (future) operation of the battery pack, as previously described. For example, historical data of how often (or total operational time) the battery pack has been demanded or desired to be operated by the extended predetermined SOC limits may be used to adapt the first threshold value. For example, in case the vehicle is operated along a very demanding route (often), the requirements for when operating the battery pack by the extended predetermined SOC limits may be adjusted accordingly. Moreover, such historical data of how often (or total operational time) the battery pack has been demanded or desired to be operated by the extended predetermined SOC limits may be used to adapt the predetermined SOC limits per se. That is, in case the vehicle is operated along a very demanding route (often), the operational window defined by extended predetermined SOC limits may be narrowed down.

According to at least one example embodiment, the battery pack condition level is defined by the state-of-health, SOH, or predetermined degradation status.

The SOH may e.g. be defined by the decline in energy and/or power capacity. For example, the SoH can be defined as the ratio of the maximum battery charge to its rated capacity: SoH (%)=100*Qmax/Cr, in which Qmax is the maximum charge available of the battery pack and Cr is the rated capacity.

According to at least one example embodiment, the method further comprises:

in response of determining that the predicted energy or power utilization is above the second threshold value, and that the battery pack condition level is above the first threshold value, operating the battery pack within the operating window defined by the normal predetermined SOC limits.

Hereby, operation of the battery pack within the operating window defined by the extended predetermined SOC limits is prohibited in response to that the battery pack condition level is above the first threshold value. Thus, excessive deterioration of the battery pack health status may be avoided.

According to at least one example embodiment, the second threshold value is corresponding to a predicted energy or power utilization which is limiting for at least one of the upper limit and lower limit of the normal predetermined SOC limits.

Hereby, a well-defined second threshold value may be set. That is, the second threshold value is defined as the energy or power utilization of the battery pack which defines the limits to what is possible to achieve by operating the battery pack in accordance with the normal predetermined SOC limits.

According to at least one example embodiment, the method comprises:

estimating required amount of energy or power of the battery pack (e.g. needed for propelling the vehicle), and in response to determining that the required amount of energy or power not enough in relation to the available energy or power according to operating the battery pack within the operating window defined by the normal predetermined SOC limits, and in response to determining that the battery pack condition level is below the first threshold value, operating the battery pack within the operating window defined by the extended predetermined SOC limits.

For example, the second threshold value may be defined by the value of amount of energy or power for which the available energy or power according to operating the battery pack within the operating window defined by the normal predetermined SOC limits is no longer possible.

According to at least one example embodiment, the method comprises the step of adjusting the operating window of the SOC from the normal predetermined SOC limits to the extended predetermined SOC limits in response of determining that the predicted energy or power utilization is above the second threshold value, and that the battery pack condition level is below the first threshold value.

Thus, during a first time interval, the battery pack may be operated within the operating window defined by the normal predetermined SOC limits. In a second time interval subsequent to the first time interval, and in response of determining that the predicted energy or power utilization is above the second threshold value, and that the battery pack condition level is below the first threshold value, the operating window of the SOC may be adjusted from the normal predetermined SOC limits to the extended predetermined SOC limits. In a third time interval subsequent to the second time interval, the battery pack may be operated within the operating window defined by the extended predetermined SOC limits.

According to at least one example embodiment, the method further comprises:

providing predicted vehicle operational information, wherein the predicted energy or power utilization of the battery pack is determined in response to the predicted vehicle operational information.

The predicted vehicle operational information may comprise predicted operational load of the battery pack during the predicted vehicle operation of the vehicle. The predicted vehicle operational information may comprise predicted initialization time of operating the vehicle, and predicted on-board charging (e.g. regenerative charging) and discharging occurrences of the battery pack, corresponding to the energy or power utilization of the battery pack. According to at least one example embodiment, the predicted vehicle operational information comprises predicted operational load of the battery pack over time, such as e.g. during a drive cycle or a work/load cycle of the vehicle. Thus, the operating window of the battery pack may be set in accordance with, or in response to, the predicted operational load of the battery pack together with the battery pack condition level. For example, the second threshold value may vary as a function of the predicted operational load of the battery pack together with the battery pack condition level.

According to at least one example embodiment, the predicted vehicle operational information is based on historical or statistical data of the vehicle operation, and/or is scheduled vehicle operational information based on a predetermined planned vehicle operation.

Hereby, various types of the vehicle information can be used as input data to determine the predicted vehicle operational information. That is, historical or statistical data of the vehicle operation may be used as input data to determine the predicted vehicle operational information, or pre-determined planned vehicle operation may be used as input to determine scheduled vehicle operational information. Stated differently, the predicted vehicle operational information may be determined in response to historical or statistical data of the vehicle operation, or may be scheduled vehicle operational information determined in response to pre-determined planned vehicle operation. For example, the historical time-span which the vehicle is operated, and/or the historical week-days which the vehicle is operated e.g. related to the historical vehicle route, may be statistically used as input data to the predicted vehicle operational information.

As the predicted vehicle operational information may be scheduled operational vehicle information, the predicted features related to the predicted vehicle operational information previously described may be scheduled features. According to at least one example embodiment, the scheduled vehicle operational information of the batter pack is set by a user or a system. For example, the predicted energy or power utilization of the battery pack may be predicted in response to a scheduled route of the vehicle comprising scheduled auxiliary actions of performing work during at least a portion of the scheduled route (i.e. being a predetermined planned vehicle operation). Hereby, the auxiliary actions of performing work may be comprised in the predicted energy or power utilization of the battery pack over time. Thus, the scheduled vehicle operational information may comprise said scheduled route of the vehicle comprising scheduled auxiliary actions of performing work during at least a portion of the scheduled route. The auxiliary actions of performing work may e.g. be at least one of loading, carrying a load, dumping a load, digging, drilling, and lifting. The auxiliary actions of performing work may e.g. be powered by a power take off, PTO.

Additionally or alternatively, external parameters such as predicted road, traffic and/or weather conditions for the predicted vehicle operational information may be used to determine e.g. vehicle operational initialization time and/or scheduled operational load of the battery pack (or predicted energy or power utilization of the battery pack). For example, a vehicle or transportation planner system may be used as input data to the pre-determined planned vehicle operation and the scheduled vehicle operational information.

According to at least one example embodiment, the predicted vehicle operational information represents future, expected, or scheduled operation of the vehicle (i.e. at least the future, expected or scheduled energy or power utilization of the battery pack). The predicted vehicle operational information may according to at least one example embodiment be predicted information in the near future (e.g. the near future of the vehicle operational initialization time), over a time span of e.g. 0 s or 1 s to 30 min, or 0 s or 1 s to 20 min, or 0 s or 1 s to 15 min or 0 s or 1 s to 10 min or 1 s to 5 min or 0 s or 1 s to 2 min or 0 s or 1 s to 1 min.

Moreover, the predicted vehicle operational information may be based on a combination of historical or statistical data of the vehicle operation, and scheduled vehicle operational information based on a pre-determined planned vehicle operation. For example, the predicted vehicle operational information may comprise a predicted route for the vehicle to travel, wherein the predicted energy or power utilization of the battery pack is determined by the energy or power utilization of the battery pack for a previous operation of the vehicle along the same predicted route. Alternatively, the predicted energy or power utilization of the battery pack is a modelled energy or power utilization of the battery pack for operation of the vehicle along the predicted route.

According to at least one example embodiment, the predicted route includes at least an upcoming road event associated with a predicted vehicle speed and/or predicted propulsion torque, wherein the predicted energy or power utilization of the battery pack is determined by the predicted vehicle speed and/or predicted propulsion torque.

According to at least one example embodiment, the vehicle comprises an electric machine for propelling the vehicle, and the RESS is configured to power the electric machine.

Thus, the battery pack of the RESS is typically configured to power the electric machine. Correspondingly, the electric machine is configured to provide regenerative power to the battery pack. This may typically be achieved by means of a regenerative braking system. The battery pack may be a high voltage battery pack. The electric machine may be referred to as a traction electric machine. According to at least one example embodiment, the electric machines is powered by the energy storage system, ESS, the ESS comprising one or several battery packs.

It should be noted that the RESS may comprise a plurality of battery packs (i.e. be a multi-battery pack system), wherein the computer implemented method of the invention is used for each one of the battery packs of the RESS.

According to at least one example embodiment, the normal predetermined SOC limits extend from a lower normal SOC limit having a SOC-value between 15% and 30%, to a higher normal SOC limit having a SOC-value between 65% and 85%.

It should be understood that the SOC of the battery pack is defined to extend from 0% to 100%, in which 0% defines an empty battery pack and 100% defines a fully charged battery pack. Thus, SOC defines the level of charge of the battery pack relative to its capacity. Thus, the lower limit of 0% and the higher limit of 100% may be defined as the absolute SOC limits of the battery pack. By providing a battery pack which is configured to be operated within an operating window defined by its state-of-charge, SOC according to normal predetermined SOC limits, the normal predetermined SOC limits being set stricter than the absolute SOC limits, the battery pack is protected from unnecessary wear and other related problems. Thus, during normal driving of the vehicle, the driver is typically not allowed to violate the normal predetermined SOC limits. It should be understood that the lower and higher normal SOC limits are predetermined.

According to at least one example embodiment, the extended predetermined SOC limits extend from a lower extended SOC limit having a SOC-value between 5% and 30%, to a higher extended SOC limit having a SOC-value between 65% and 95%.

By providing a battery pack which is configured to be operated within an operating window defined by its state-of-charge, SOC according to extended predetermined SOC limits, the extended predetermined SOC limits being set stricter than the absolute SOC limits, the battery pack is protected from unnecessary wear and other related problems. Moreover, by that at least one of the upper limit and lower limit of the extended predetermined SOC limits exceeds the corresponding limit of the normal predetermined SOC limits (i.e. either that the lower limit of the extended predetermined SOC limits is lower than the lower limit of the normal predetermined SOC limits, or that the higher limit of the extended predetermined SOC limits is higher than the higher limit of the normal predetermined SOC limits), increased utilization of the battery pack can be applied when needed. It should be understood that the lower and higher extended SOC limits are predetermined.

According to at least one example embodiment, the normal predetermined SOC limits extend from a lower normal SOC limit having a SOC-value between 25% and 35%, to a higher normal SOC limit having a SOC-value between 55% and 74%, and wherein the extended predetermined SOC limits extend from a lower extended SOC limit having a SOC-value between 5% and 24%, to a higher extended SOC limit having a SOC-value between 75% and 95%.

According to at least one example embodiment, the battery pack is capable of attaining a higher energy or power utilization when operating in an operating window defined by the extended predetermined SOC limits as compared to when operating in an operating window defined by the normal predetermined SOC limits.

According to at least one example embodiment, the first threshold value and the second threshold value are predetermined. That is, the first and second threshold values are well-defined and predetermined, in order to control when the battery pack is operated in accordance with the normal predetermined SOC limits, and when the battery pack is operated in accordance with the extended predetermined SOC limits, as well as when the limitations of the battery pack is changed from operating in accordance with the normal predetermined SOC limits to be allowed to be operating in accordance with the extended predetermined SOC limits.

According to at least one example embodiment, the battery pack is configured to be operated with a dynamic operating window defined by its SOC. The dynamic operating window is defined at least by the normal predetermined SOC limits and extended predetermined SOC limits previously described.

According to at least one example embodiment, the predicted energy or power utilization of the battery pack is predicted energy and/or power utilization of the battery pack. Thus, the wording predicted energy or power utilization does not exclude predicted energy and power utilization, only that at least one of the energy utilization and power utilization of the battery pack is predicted. Hence, throughout the application, the predicted energy or power utilization of the battery pack may be referred to as the predicted energy and/or power utilization of the battery pack.

According to at least one example embodiment, the predicted energy or power utilization of the battery pack is a function of time or distance. Thus, the predicted energy or power utilization of the battery pack may be determined over a predetermined time period, or over a predetermined distance (or predetermined route or position along the predetermined route).

According to a second aspect of the invention, an electric vehicle is provided. The electric vehicle comprises a controlling apparatus configured to carry out the method for controlling energy or power utilization of a battery pack in a rechargeable energy storage system, RESS, of the vehicle, according to the first aspect of the invention.

According to a third aspect of the invention, a computer program comprising program code means for performing the steps of the first aspect of the invention, when said program is run on a computer, is provided.

Such computer program may e.g. be implemented in an electronic control unit, ECU, of the vehicle. The ECU may correspond to the controlling apparatus in the second aspect of the invention.

According to a fourth aspect of the invention, a computer readable medium carrying a computer program comprising program code means for performing the steps of the first aspect of the invention, when said computer program is run on a computer, is provided.

Effects and features of the second to fourth aspects of the invention are largely analogous to those described above in connection with the first aspect of the invention. Embodiments mentioned in relation to the first aspect of the invention are largely compatible with the second to fourth aspects of the invention.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
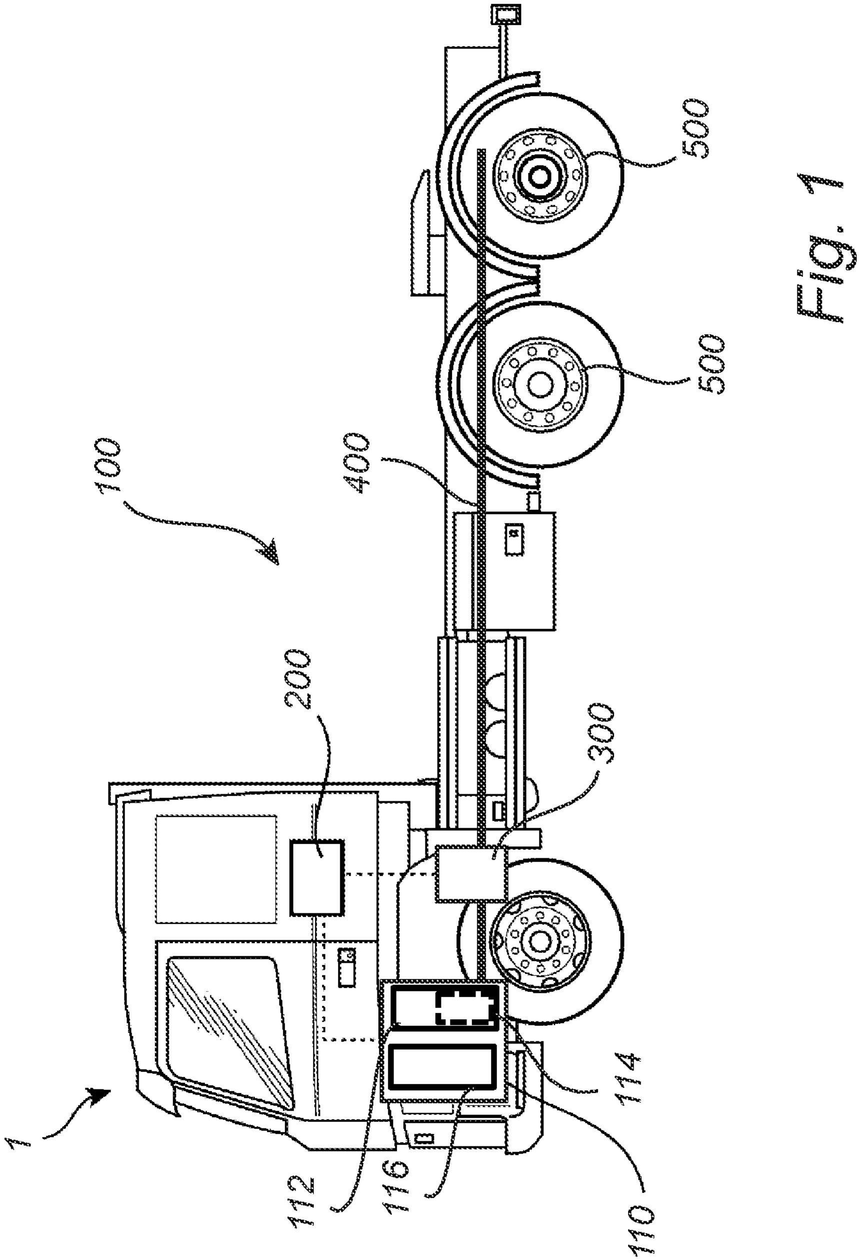
FIG. 1 is a side schematic view of a vehicle comprising a powertrain with a battery pack in a rechargeable energy storage system, RESS, and a controlling apparatus in accordance with an example embodiment of the invention.

With reference to FIG. 1 a vehicle 1, here embodied as a heavy duty truck 1, is disclosed for which a powertrain 100 with a controlling apparatus 200 of a kind disclosed in the present invention is advantageous. However, the powertrain 100, or controlling apparatus 200, may as well be implemented in other types of vehicles, such as in busses, lightweight trucks, passenger cars, marine applications etc. The vehicle 1 is an electric vehicle, such as a full electric vehicle or a hybrid, wherein the powertrain 100 comprises an electric driveline 110 comprising a rechargeable energy storage system, RESS, 112 including at least one battery pack 114, and a at least one electric machine 116 powered by the battery pack 114. As seen in FIG. 1, the powertrain 100 may further comprise a transmission 300 comprising at least a gearbox, and drive shafts 400 configured to transfer motion to the drive wheels 500.

The battery pack 114 is configured to be operated within an operating window defined by its state-of-charge, SOC, according to normal predetermined SOC limits and extended predetermined SOC limits. For the extended predetermined SOC limits, at least one of the upper limit and lower limit exceeds the corresponding limit of the normal predetermined SOC limits. This is shown in more detail in the graph of FIG. 2.

Figure 2:
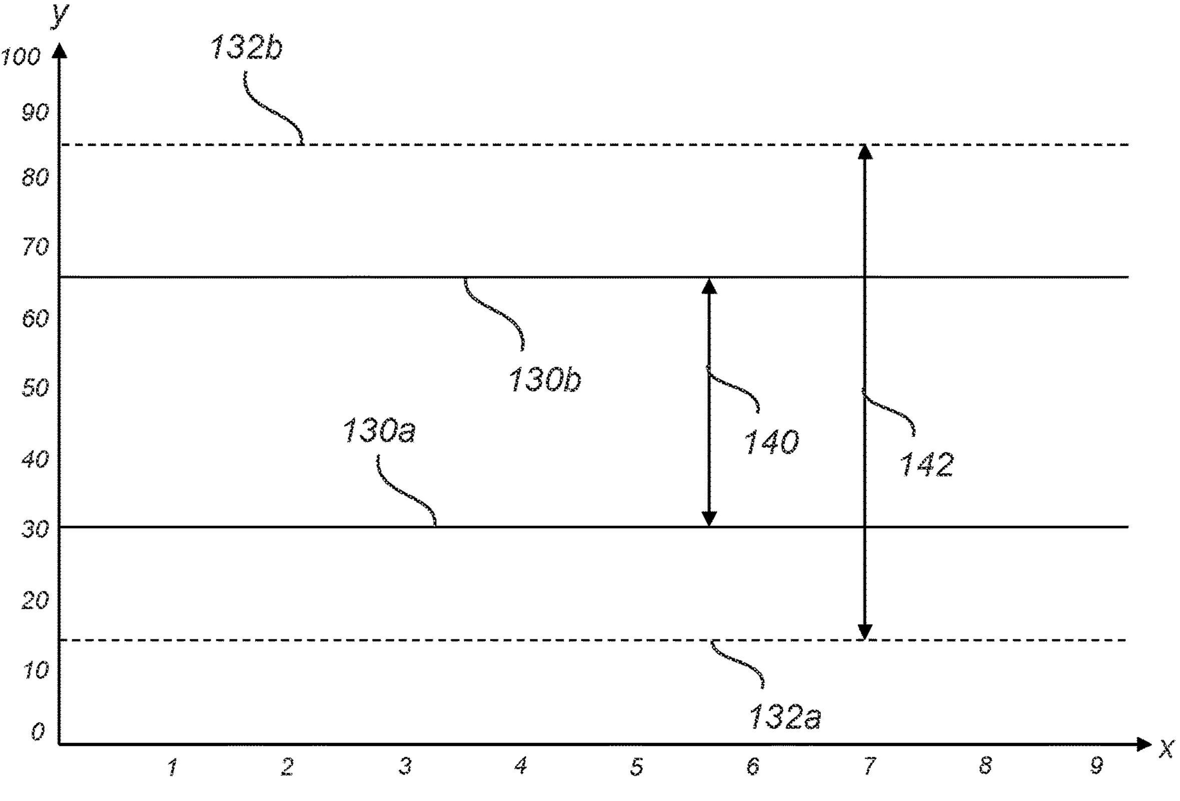
FIG. 2 is a graph showing normal and extended predetermined SOC limits of a battery pack in accordance with an example embodiment of the invention.

In the graph of FIG. 2, the y-axis represents the SOC of the battery pack defined by the absolute SOC-limits of which 0% defines an empty battery pack and 100% defines a fully charged battery pack, and the x-axis represents time (in units of e.g. minutes). Moreover, in the graph of FIG. 2, normal predetermined SOC limits 130*a*, 130*b* are defined to extend from a lower normal SOC limit 130*a* having a SOC-value of 30%, to a higher normal SOC limit 130*b* having a SOC-value of 65%. The operating window 140 of the battery pack in accordance with the normal predetermined SOC limits 130*a*, 130*b* is symbolized by a first double ended arrow 140. Thus, the battery pack is configured to be operated within the operating window 140 according to the normal predetermined SOC limits 130*a*, 130*b*.

In the graph of FIG. 2, extended predetermined SOC limits 132*a*, 132*b* are defined to extend from a lower extended SOC limit 132*a* having a SOC-value of 15%, to a higher extended SOC limit 132*b* having a SOC-value of 85%. The operating window 142 of the battery pack in accordance with the extended predetermined SOC limits 132*a*, 132*b* is symbolized by a second double ended arrow 142. Thus, the battery pack is configured to be operated within the operating window 142 according to the extended predetermined SOC limits 132*a*, 132*b*. It should be noted that in the graph of FIG. 2, the lower and higher normal SOC limits 130*a*, 130*b* are both set stricter than the corresponding lower and higher extended SOC limits 132*a*, 132*b* (i.e. the lower normal SOC limit 130*a* is less low than the lower extended SOC limit 132*a*, and the higher normal SOC limit 130*b* is less high than the higher extended SOC limit 132*b*). However, according to at least one example embodiment, only one of the lower and higher normal SOC limits 130*a*, 130*b* is set stricter than the corresponding lower and higher extended SOC limits 132*a*, 132*b* (i.e. either the lower normal SOC limit 130*a* is set to be less low than the lower extended SOC limit 132*a*, or the higher normal SOC limit 130*b* is set to be less high than the higher extended SOC limit 132*b*). For simplicity, the SOC-values of the normal predetermined SOC limits 130*a*, 130*b* and the extended predetermined SOC limits 132*a*, 132*b* are straight lines in FIG. 2, and are thus shown to be constant over the given time period (but they may alternatively vary over the given time period).

A computer implemented method for controlling energy or power utilization of a battery pack in a rechargeable energy storage system, RESS, of a vehicle, such as battery pack 114 of RESS 112 of vehicle 1 in FIG. 1, will now be described in more general terms with reference to the flow chart of FIG. 3. The battery pack is configured to be operated within an operating window defined by its state-of-charge, SOC, according to normal predetermined SOC limits, such as the operating window 140 and the normal predetermined SOC limits 130*a*, 130*b* shown in FIG. 2, and extended predetermined SOC limits in which at least one of the upper limit and lower limit exceeds the corresponding limit of the normal predetermined SOC limits, such as the operating window 142 and the extended predetermined SOC limits 132*a*, 132*b* shown in FIG. 2. Stated differently, the battery pack is capable of attaining a higher energy or power utilization when operating in an operating window defined by the extended predetermined SOC limits as compared to when operating in an operating window defined by the normal predetermined SOC limits. The operation of the battery pack according to the normal predetermined SOC limits and the extended predetermined SOC limits may e.g. be governed and controlled by the controlling apparatus 200 shown in FIG. 1. Thus, the computer implemented method may be applied to a vehicle 1 comprising an electric machine 116 for propelling the vehicle 1, for which the RESS 112 is configured to power the electric machine 116.

In a step S10, e.g. being a first step S10, a battery pack condition level is determined. The battery pack condition level may e.g. be defined by the total amount of times, or total operational time, in which the battery pack has been operated by the extended predetermined SOC limits as compared to the normal predetermined SOC limits. Additionally or alternative, the battery pack condition level may be defined by the estimated total amount of times, or estimated total operational time, in which the battery pack is predicted to be operated by the extended predetermined SOC limits as compared to the normal predetermined SOC limits during the predicted energy or power utilization of the battery pack. Thus, according to at least one example embodiment, the battery pack condition level is defined by a combination of the total amount of times, or total operational time, in which the battery pack has been operated by the extended predetermined SOC limits as compared to the normal predetermined SOC limits, and the estimated total amount of times, or estimated total operational time, in which the battery pack is predicted to be operated by the extended predetermined SOC limits as compared to the normal predetermined SOC limits during the predicted energy or power utilization of the battery pack. As a further alternative, the battery pack condition level may be defined by the state-of-health, SOH, or predetermined (or modelled, or calculated) degradation status.

In a step S20, e.g. being a second step S20, the determined battery pack condition level is compared with a first threshold value. The first threshold value typically corresponds to a battery pack condition level threshold. The first threshold value may vary over time, e.g. in accordance with aging of the battery pack.

In a step S30, e.g. being a third step S30, predicted energy or power utilization of the battery pack is provided. The predicted energy or power utilization of the battery pack may be as a function of time or distance. The step S30 may be preceded by a step S28 of providing predicted vehicle operational information. The vehicle operational information may comprise, or be used to determine, the predicted energy or power utilization of the battery pack. The predicted vehicle operational information may be based on historical or statistical data of the vehicle operation. Additionally or alternatively, the predicted vehicle operational information may be scheduled vehicle operational information based on a pre-determined planned vehicle operation. For example, the predicted energy or power utilization of the battery pack may be handled by a controller in the vehicle using predictive energy management with forecast of upcoming driving conditions.

In a step S40, e.g. being a fourth step S40, the predicted energy or power utilization is compared with a second threshold value. The second threshold value typically corresponds to a predicted energy or power utilization threshold. For example, the second threshold may correspond to a predicted energy or power utilization which is limiting for at least one of the upper limit and lower limit of the normal predetermined SOC limits.

In a step S50, e.g. being a fifth step S50, the battery pack is operated within the operating window defined by the normal predetermined SOC limits. The step S50 may e.g. be performed in response of determining that the predicted energy or power utilization is below the second threshold value. As previously stated, the normal predetermined SOC limits may correspond to those described with reference to FIG. 2. In other words, the operation of the battery pack may be limited to be operated within the operating window defined by the normal predetermined SOC limits in response of determining that the predicted energy or power utilization is below the second threshold value. The normal predetermined SOC limits may extend from the lower normal SOC limit having a SOC-value between 15% and 30%, to the higher normal SOC limit having a SOC-value between 65% and 85%. According to at least one example embodiment, the operation of the battery pack outside of the operating window defined by the normal predetermined SOC limits is prohibited in response of determining that the predicted energy or power utilization is below the second threshold value. The control of the operation of the battery pack may, as previously stated, be achieved by controlling apparatus 200 shown in FIG. 1.

In a step S60, e.g. be a sixth step S60, or being a fifth step instead of S50, and in response of determining that the predicted energy or power utilization is above the second threshold value, and that the battery pack condition level is below the first threshold value, the battery pack is operated within the operating window defined by the extended predetermined SOC limits. As previously stated, the extended predetermined SOC limits may correspond to those described with reference to FIG. 2. In other words, the operation of the battery pack may be limited to be operated within the operating window defined by the extended predetermined SOC limits in response of determining that the predicted energy or power utilization is above the second threshold value, and that the battery pack condition level is below the first threshold value. The extended predetermined SOC limits may extend from the lower extended SOC limit having a SOC-value between 5% and 30%, to the higher extended SOC limit having a SOC-value between 65% and 95%. According to at least one example embodiment, the operation of the battery pack outside of the operating window defined by the extended predetermined SOC limits is prohibited in response of determining that the predicted energy or power utilization is above the second threshold value, and that the battery pack condition level is below the first threshold value. The control of the operation of the battery pack may, as previously stated, be achieved by controlling apparatus 200 shown in FIG. 1.

The step S50 may additionally be performed in response of determining that the predicted energy or power utilization is above the second threshold value, and that the battery pack condition level is above the first threshold value. Thus, in case the battery pack condition level is above the first threshold value, operation of the battery pack within the operating window defined by the extended predetermined SOC limits is prohibited. Thus, excessive deterioration of the battery pack health status may be avoided.

Figure 3:
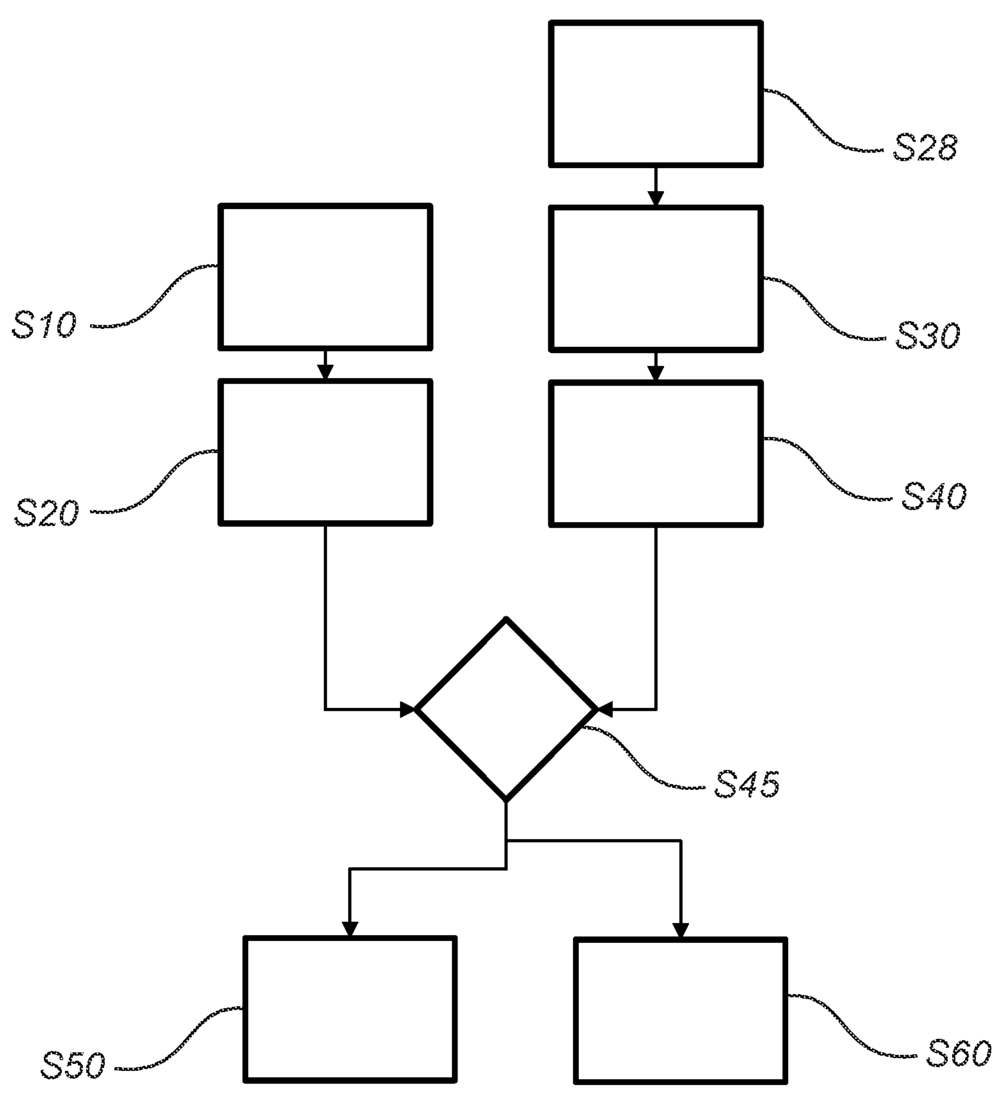
FIG. 3 is a flowchart illustrating the steps of a method in accordance with one example embodiment of the invention.

As shown in FIG. 3, the steps S10 and S20 may be performed subsequently, and in parallel to the subsequent steps S28, S30 and S40. Moreover, the comparison of the predicted energy or power utilization with the second threshold value in step S40, and the comparison of the battery pack condition level with the first threshold value in step S20, may be grouped into a separated decision making step S45. Thus, depending on the outcome of the two comparisons made in steps S20 and S40, the decision making step S45 results in the operation of the battery pack either in accordance with step S50 or in accordance with step S60.

Figure 4:
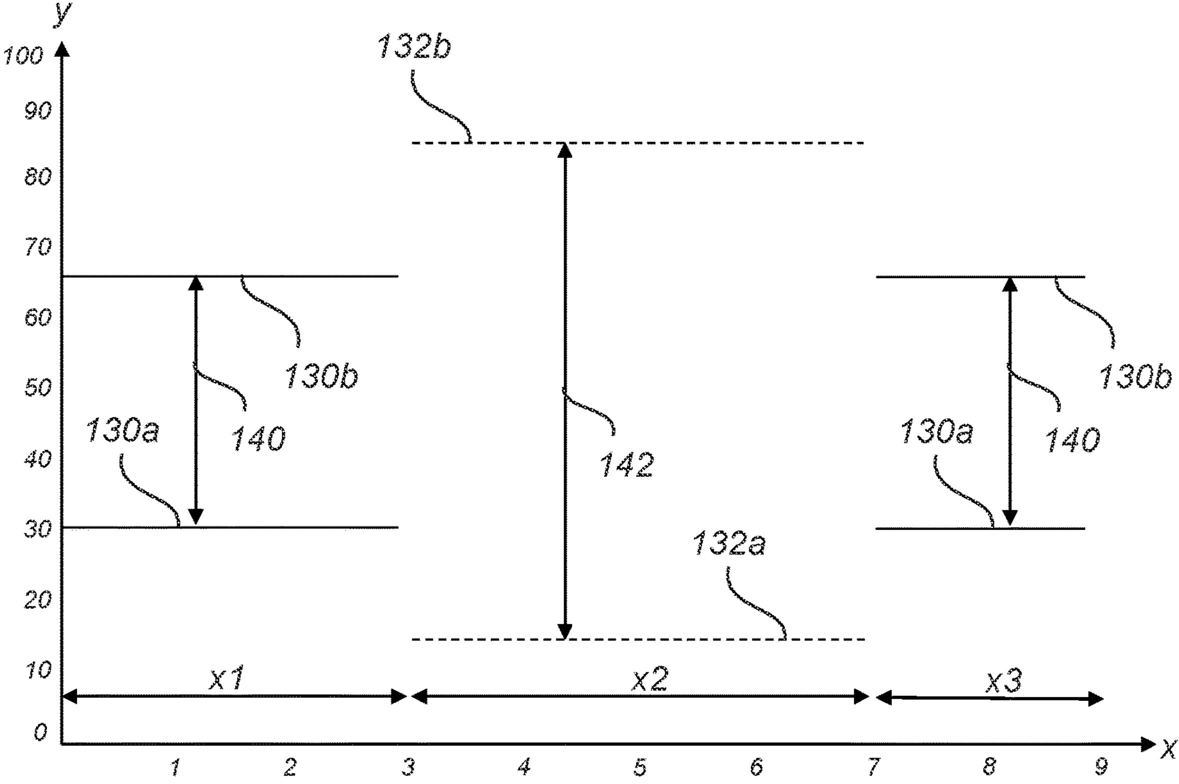
FIG. 4 is a graph illustrating the operation of the battery pack of FIG. 2 showing how the normal and extended predetermined SOC limits varies as a function of time.

In the graph of FIG. 4, the operation of the battery pack according to the normal predetermined SOC limits and the extended predetermined SOC limits, and in response to the battery pack condition level and predicted energy or power utilization, is exemplified. The graph of FIG. 4 is similar to that of FIG. 2. Thus, the y-axis represents the SOC of the battery pack defined by the absolute SOC-limits of which 0% defines an empty battery pack and 100% defines a fully charged battery pack, and the x-axis represents time (in units of e.g. minutes). The same reference numerals are thus used for the operating window 140 of the normal predetermined SOC limits 130*a*, 130*b* (defined to extend from the lower normal SOC limit 130*a* having a SOC-value of 30%, to the higher normal SOC limit 130*b* having a SOC-value of 65%) and the operating window 142 of the extended predetermined SOC limits 132*a*, 132*b* (defined to extend from the lower extended SOC limit 132*a* having a SOC-value of 15%, to the higher extended SOC limit 132*b* having a SOC-value of 85%).

Depending on if the determined battery pack condition level and the predicted energy or power utilization, the operation of the battery pack in accordance with the normal predetermined SOC limits and the extended predetermined SOC limits varies.

In a first time period, x1, between time units 0 and 3, the battery pack is operated within the operating window 140 defined by the normal predetermined SOC limits 130*a*, 130*b*, corresponding to the step S50 of the method described with reference to FIG. 3 (that is, the battery pack is only allowed to be operated within the operating window 140). Thus, it has been determined that the predicted energy or power utilization is below the second threshold value, or that the predicted energy or power utilization is above the second threshold value but that the battery pack condition level is above the first threshold value. In either way, operation of the battery pack within the operating window 142 defined by the extended predetermined SOC limits 132*a*, 132*b* is prohibited, because it is not needed, and/or that excessive deterioration of the battery pack health status is to be avoided. Operation of the battery pack during the first time period x1 may e.g. correspond to driving the vehicle along a flat road without the need of any sudden accelerations of the vehicle.

In a second time period, x2, between time units 3 and 7, the battery pack is operated within the operating window 142 defined by the extended predetermined SOC limits 132*a*, 132*b*, corresponding to the step S60 of the method described with reference to FIG. 3. Thus, it has been determined that the predicted energy or power utilization is above the second threshold value, and that the battery pack condition level is below the first threshold value. Hereby, the battery pack is capable of attaining a higher energy or power utilization as compared to when operating in an operating window 140 defined by the normal predetermined SOC limits 130*a*, 130*b*. Operation of the battery pack during the second time period x2 may e.g. correspond to driving the vehicle uphill and/or performing sudden accelerations of the vehicle. Alternatively, the operation of the battery pack during the second time period x2 may correspond to driving the vehicle downhill for which an increased amount of energy is to be charged to the battery pack by means of regenerative braking.

In a third time period, x3, between time units 7 and 9, the battery pack is once again operated within the operating window 140 defined by the normal predetermined SOC limits 130*a*, 130*b*, corresponding to the step S50 of the method described with reference to FIG. 3 (again, the battery pack is only allowed to be operated within the operating window 140). Here, the predicted energy or power utilization may still be determined to be above the second threshold value, but the battery pack health status may have worsened such that the battery pack condition level is above the first threshold value, as compared to during the second time period x2.

Thus, the operation of the battery pack, and the limitations of the operation of the battery pack, in accordance with the normal predetermined SOC limits and the extended predetermined SOC limits varies over time. The controlling apparatus 200 may be configured to control the operation of the battery pack.

According to at least one example embodiment, the controlling apparatus 200 of FIG. 1 is configured to perform the method as described with reference to FIG. 3. The method as described with reference to FIG. 3 may thus be implemented in a computer program. Thus, the computer program may comprise program code means for performing the method as described with reference to FIG. 3, when the program is run on a computer. Alternatively the method as described with reference to FIG. 3 may be implemented in a computer readable medium carrying a computer program comprising program code means for performing the method as described with reference to FIG. 3, when the computer program is run on a computer. Thus, the program code means may comprise instructions to cause the powertrain 100 (e.g. the battery pack 114) to be operated according to at least some of the steps described with reference to FIG. 3.

It should be noted that the naming of the steps not necessarily, but might according to at least one example embodiment, relate to the order in which the steps are carried out. Thus, the order of the steps may be different than that explained here, and the controlling apparatus 200 of FIG. 1 may be configured to carry out one or several of the steps. Moreover, one or more of the steps may be combined and carried out simultaneously.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A computer implemented method for controlling energy or power utilization of a battery pack in a rechargeable energy storage system, RESS, of a vehicle, the battery pack being configured to be operated within an operating window defined by its state-of-charge, SOC, according to normal predetermined SOC limits, and extended predetermined SOC limits in which at least one of the upper limit and lower limit exceeds the corresponding limit of the normal predetermined SOC limits, the method comprising:

determining a battery pack condition level representative of a battery health status of the battery pack, comparing the battery pack condition level with a first threshold value, providing predicted energy or power utilization of the battery pack, comparing the predicted energy or power utilization with a second threshold value, in response of determining that the predicted energy or power utilization is below the second threshold value, operating the battery pack within the operating window defined by the normal predetermined SOC limits, and in response of determining that the predicted energy or power utilization is above the second threshold value, and that the battery pack condition level is below the first threshold value, operating the battery pack within the operating window defined by the extended predetermined SOC limits, such that operating the battery pack within the operating window defined by the extended predetermined SOC limits is allowed in response to the battery health status being sufficiently good as indicated by the battery pack condition level being below the first threshold value.

2. The method according to claim 1, wherein the battery pack condition level is defined at least by the total amount of times, or total operational time, in which the battery pack has been operated by the extended predetermined SOC limits as compared to the normal predetermined SOC limits.

3. The method according to claim 1, wherein the battery pack condition level is defined at least by the estimated total amount of times, or total operational time, in which the battery pack is predicted to be operated by the extended predetermined SOC limits as compared to the normal predetermined SOC limits during the predicted energy or power utilization of the battery pack.

4. The method according to claim 1, wherein the battery pack condition level is defined by the state-of-health, SOH, or predetermined degradation status.

5. The method according to claim 1, further comprising: in response of determining that the predicted energy or power utilization is above the second threshold value, and that the battery pack condition level is above the first threshold value, operating the battery pack within the operating window defined by the normal predetermined SOC limits.

6. The method according to claim 1, wherein the second threshold value is corresponding to a predicted energy or power utilization which is limiting for at least one of the upper limit and lower limit of the normal predetermined SOC limits.

7. The method according to claim 1, further comprising: providing predicted vehicle operational information, wherein the predicted energy or power utilization of the battery pack is determined in response to the predicted vehicle operational information.

8. The method according to claim 7, wherein the predicted vehicle operational information is based on historical or statistical data of the vehicle operation, and/or is scheduled vehicle operational information based on a pre-determined planned vehicle operation.

9. The method according to claim 1, wherein the vehicle comprises an electric machine for propelling the vehicle, and the RESS is configured to power the electric machine.

10. The method according to claim 1, wherein the normal predetermined SOC limits extend from a lower normal SOC limit having a SOC-value between 15% and 30%, to a higher normal SOC limit having a SOC-value between 65% and 85%.

11. The method according to claim 1, wherein the extended predetermined SOC limits extend from a lower extended SOC limit having a SOC-value between 5% and 30%, to a higher extended SOC limit having a SOC-value between 65% and 95%.

12. The method according to claim 1, wherein the battery pack is capable of attaining a higher energy or power utilization when operating in an operating window defined by the extended predetermined SOC limits as compared to when operating in an operating window defined by the normal predetermined SOC limits.

13. An electric vehicle comprising a controlling apparatus configured to carry out the method for controlling energy or power utilization of a battery pack in a rechargeable energy storage system, RESS, of the vehicle, according to claim 1.

14. A non-transitory computer readable medium carrying a computer program comprising program code for performing the method according to claim 1, when the program code is run on a computer.

* * * * *